Oct. 27, 1970 R. B. RUBINSTEIN ET AL 3,536,936

CLOCK GENERATOR

Filed Oct. 10, 1968

INVENTORS
RICHARD B. RUBINSTEIN
LEO COHEN
ATTILA TETIK
BY James & Franklin
ATTORNEY United States Patent Office 3,536,936
Patented Oct. 27, 1970

3,536,936

CLOCK GENERATOR

Richard B. Rubinstein, New York, Leo Cohen, Commack, and Attila Tetik, New York, N.Y., assignors to General Instrument Corporation, Newark, N.J., a corporation of Delaware Filed Oct. 10, 1968, Ser. No. 766,489
Int. Cl. H03k *5/13*
U.S. Cl. 307—269 23 Claims

ABSTRACT OF THE DISCLOSURE

A clock generator develops an output time signal from two input timed signals having an interval therebetween, the output signal being charged to a first level in response to one of the input signals and returned to a second level in response to the second of the input signals, the output signal being affirmatively retained at said first level in the interval between the two input signals.

Figure 1:
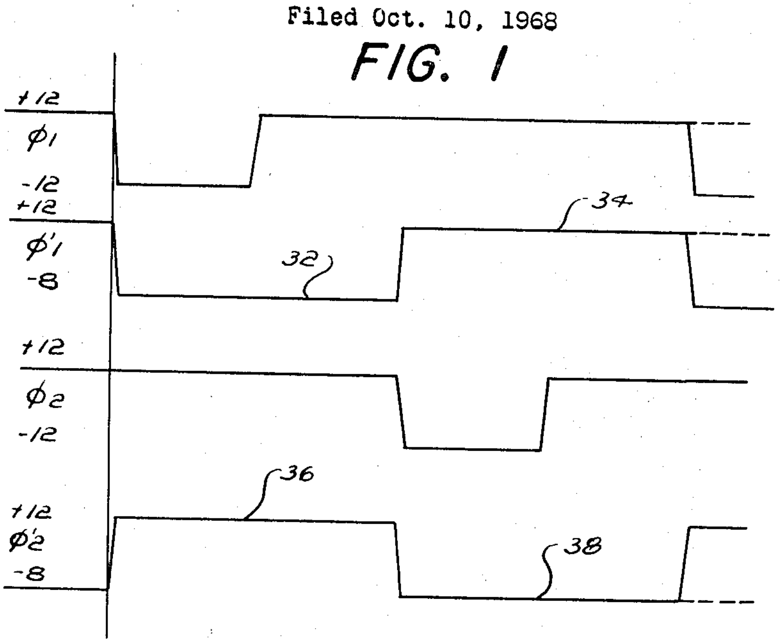

The present invention relates to circuitry for generating timed clock pulses, and particularly to a circuit for generating timed signals from two sequential input signals.

Accurately timed clock signals are widely used in the operation of logic circuitry such as that conventionally found in computers. Many circuits are known which generate such clock signals at desired high frequencies and accuracy. These clock pulses are used to control the timed operation of the various logic blocks in the computer such as counters, shift registers, memory units and the like. The prime requirement for clock pulses utilized in these logic circuits is that they be properly related to one another in the desired phase relation and that they have the proper amplitude and shape for accurate logic operation of the various circuits controlled thereby.

In recent years, logic circuitry has been developed utilizing what may be defined as four-phase logic, in which the timed control of the operation of the various logic circuits is determined by four sequential clock signals having a specified time and phase relation with one another. One type of four-phase logic clocks includes four clock phases in which two of the clock phases are unique or non-overlapping, and the other two phases occur during the period of one of the unique phases respectively, and extend in time until the onset of the following unique clock phase. A typical logic system utilizing clocks of this type is a memory system such as that described in copending application entitled "Random Access Read-Write Memory System Having Data Refreshing Capabilities and Memory Cell Therefor," filed on even date herewith, and assigned to the assignee of the present application.

While it is possible to separately generate each of the four clock phases externally, it is highly desirable to reduce the number of the external clock generating circuits by supplying only two externally generated clocks and generating the overlapping clock phases from them by means of circuitry which can be readily incorporated into the integrated circuit assembly in which the controlled circuits are also formed.

In an application entitled "Four-Phase Clock Circuit," filed in the name of Frank A. Wanlass, Ser. No. 567,954, filed on July 26, 1966, Pat. No. 3,448,295, and also assigned to the assignee of the present application, there is disclosed a circuit which receives two spaced input clocks and generates two additional overlapping clock pulses. While that circuit is effective in producing the additional clock phases having the desired timed relationship with the two input clock pulses, there are certain drawbacks to the operation of that circuit in certain applications, and particularly in those applications in which a large number of external circuits receive the four-phase clock pulses developed thereby. The output levels of the internally generated overlapping clock phases are required to be maintained at a specified operative polarity during those portions of their respective periods between the two externally supplied input clock pulses. In those intervening periods, in the prior clock circuit, the overlapping clock phase terminals were not connected to any external drive source, but rather remained "floating" at their charged level solely because there was no effective discharging path for them. As a result, feedback or noise signals derived from the logic circuitry to which these clock pulses or phases were supplied tended to affect the charge applied to those terminals and hence altered the level of the clock phases to an inadmissible extent. This problem of deterioration of the floating output clock phase signals becomes more pronounced as the number of output circuits operatively connected to the output terminals of the clock generator increases, since each of those circuits constitutes a source of charge-altering feedback and noise signals. As a result, the use of the prior art four-phase clock generating circuits has been limited to systems in which only a relatively few output circuits are connected to the clock generator circuit. The desirability of providing a clock generator circuit which can produce a similar timed clock pulse pattern and which can also be utilized to control a large number of logic circuits will be apparent.

It is thus a prime object of the present invention to provide a clock generator circuit capable of producing clock pulses of the type described in which the clock phases are substantially unaffected by their load circuits.

It is also an object of the present invention to provide a clock generator circuit capable of deriving overlapping clock phases from two timed input clock signals.

It is a further object of the present invention to provide a clock generator circuit capable of producing a pair of output signals at a predetermined phase relation to a pair of unique spaced input signals, in which the output signals are affirmatively maintained at their desired levels in the period between the two input signals.

It is yet another object of the present invention to provide a clock generator circuit in which the elements of that circuit can be readily formed in an integrated circuit.

It is yet a further object of the present invention to provide a clock generator circuit of the type described which can be used both for synchronous and asynchronous external timed input signals while still maintaining the desired relationship of the generated clock phases.

It is an additional object of the present invention to provide a clock generating circuit in which the generated clock phase signals are rapidly and accurately charged to their desired levels and which utilizes relatively small switching devices towards that end.

To these ends, the clock generator circuit of the present invention comprises a circuit capable of converting two sequential and time-spaced input signals into at least one output signal, said output signal being charged to a first level by one of the input signals and being affirmatively maintained at said first level for a period of time beyond that first input signal and being charged to a second level in response to the other of the input signals. The circuit comprises an output terminal at which the output signal is developed and a source of potential effective to charge the output terminal to said first level. First switch means responsive to the first input signal is effective when actuated to connect the output terminal and said source, thereby to charge the output signal to its first level, and to maintain that connection during the interval between said first and second signals, thereby affirmatively to maintain the output signal at said first level during that interval. Second switch means responsive to the second input signal is effective when actuated to disconnect the output terminal and said source and to connect the output terminal in the circuit in such a manner that said output circuit is charged to said second level.

The first switch means may comprise one means actuated by said first input signal to effect the connection of said output terminal and said source in a rapid fashion, and another means actuated by said first and second input signals for maintaining that connection once it is made until the appearance of said second signal and then breaking that connection. Thus said one means may comprise a biasing transistor the output circuit of which is connected between said source and said output terminal and the control electrode of which is actuated by said first input signal; said other means may comprise another biasing transistor whose output circuit is similarly connected and whose control electrode is connected to a circuit node connected to said source and to a source of opposite operative sense by the output circuits of two additional transistors respectively, the control electrodes of those two additional transistors being respectively actuated by said first and second input signals. When the first of these two additional transistors is conductive, said node is at a potential such as to render said other biasing transistor conductive, the node remaining at that potential even though the first of said additional transistors becomes non-conductive (during the interval between the first and second input signals) until the second of these two additional transistors becomes conductive (when the second input signal appears), changing the potential of said node so as to render said other biasing transistor non-conductive. The conductivity of said other of said biasing transistors is effective to affirmatively clamp or maintain the output terminal at its first value. The first mentioned biasing transistor is used only to speed the output terminal in attaining its first value, and may be eliminated where speed is not a factor.

To generate the two overlapping pulses from two externally supplied input clock signals, two circuits of this type are combined, the clock signal inputs to the two circuits being reversed to obtain the desired opposite phase relation of the two generated overlapping pulses. For use of the circuit with asynchronous external clock pulses, (where relatively long intervals may pass between clock cycles) a high resistance is provided in one circuit (preferably the one generating the last output signal of a cycle) between its output terminal and said potential source, that resistance preventing the output signal of its circuit from leaking, in the interval between successive input cycles, towards the substrate potential of the integrated circuit wafer material which may be of opposite polarity to the desired level of the output signal. The output terminal of that circuit is connected by yet another switch means actuated by a disabling signal which may be the generated output signal of the other circuit, to a second potential source of an opposite polarity than the substrate potential, to prevent the output signal of that circuit from charging to the level of the first potential source in the period in which the other circuit is generating an output signal. By a proper selection of the potential sources, proper phase and time relationship between the two output clock signals is thus assured for asynchronous as well as synchronous input clock signals.

The various electronic switches utilized in the clock generator circuit of this invention are specifically disclosed as field effect transistors which can be readily formed on a single chip of semi-conductor material. These transistors comprise a pair of output terminals generally termed the source and drain and a control terminal generally designated as the gate. A closed circuit between the source and drain terminals is established when a negative signal is applied to the gate, and an open circuit is established between the output terminals when a positive or ground potential is applied to the gate. Field effect transistors are capable of switching at high speeds and are therefore highly suitable for use in high speed computer logic circuitry.

Figure 2A:
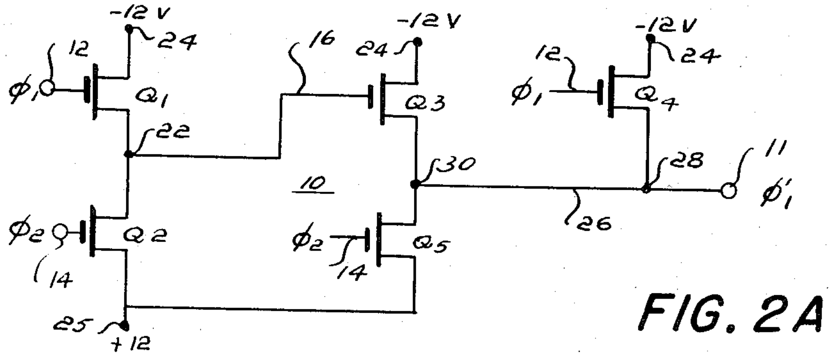
Figure 2B:
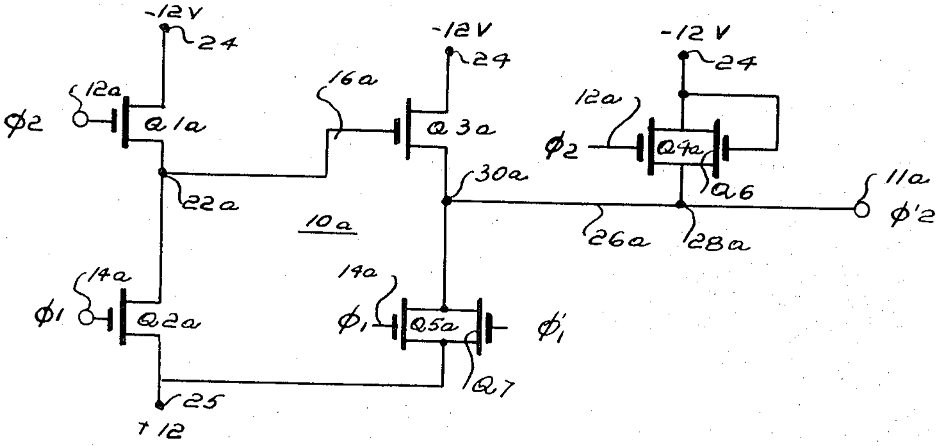

To the accomplishment of the above, and to such other objects as may hereinafter appear, the present invention relates to a clock circuit for generating overlapping clock pulses from two timed input signals, as defined in the accompanying claims and as described in this specification, taken together with the accompanying drawing in which:

FIG. 1 is a graphical representation of the timing relation of the input clock pulses and the clock phases generated by the circuit of this invention; and FIGS. 2A and 2B are circuit diagrams of preferred embodiments of the present invention.

The clock circuit of this invention, generally designated as 10 as illustrated in FIG. 2A, comprises an output terminal 11 at which an overlapping output clock pulse is to be generated. The circuit has applied at its input ports 12 and 14 a pair of sequentially spaced input clock signals which actuate switch means arranged in the circuit to develop the desired output signal at terminal 11. As it is desired to generate two output pulses in predetermined phases relation with one another, two substantially similar circuits are provided, each receiving the same input clock signals. The second of these circuits, generally designated as 10*a*, is illustrated in FIG. 2B.

Typical sequentially spaced input clock signals $\phi_1$ and $\phi_2$ are illustrated in the first and third rows of FIG. 1 which show the output and input signals in their time and amplitude relationships, the time being represented on the horizontal axis and the amplitude being represented on the vertical axis. Each of the input clock signals $\phi_1$ and $\phi_2$ may be considered as being normally at +12 volts, and as sequentially having a negative operative pulse at which the signal is at −12 volts. The negative pulse of each of the input clock signals is designated as the "time" of that clock phase, that is, "$\phi_1$ time" indicates the presence of the negative portion of the $\phi_1$ clock, and "$\phi_2$ time" indicates the presence of the negative portion of the $\phi_2$ clock. The input clock signals $\phi_1$ and $\phi_2$ may either by synchronous, at frequencies in the order of 5 mHz., or asynchronous, depending on the logic operation of the circuit or circuits which receive the clock pulses generated by circuits 10 and 10*a*. The two additional clock phases $\phi'_1$ and $\phi'_2$ to be generated by the circuits 10 and 10*a* are respectively illustrated in the second and fourth rows of FIG. 1. The clock phase $\phi'_1$ goes negative at the leading negative edge of $\phi_1$ time, and remains negative until the onset of $\phi_2$ time. The other generated clock phase $\phi'_2$ is at a positive level until it becomes negative at the onset of $\phi_2$ time and remains negative until the onset of the subsequent $\phi_1$ time. Thus, as is apparent from FIG. 1, clock phase $\phi'_1$ overlaps input clock pulse $\phi_1$ and continues until the onset of $\phi_2$ time, and clock phase $\phi'_2$ overlaps input clock pulse $\phi_2$ until the onset of the next $\phi_1$ time.

The circuit 10 is effective to develop the $\phi'_1$ clock phase at output terminal 11, and circuit 10*a* is effective to develop the $\phi'_2$ clock phase at output terminal 11*a*. As circuits 10 and 10*a* are substantially similar in their basic organizations and manner of operation, the circuit 10 will be described first, it being understood that this description is also relevant to circuit 10*a*.

Circuit 10 comprises a pair of electronic switch means here shown as field effective transistors Q1 and Q2. The gate of transistor Q1 has input clock pulse $\phi_1$ applied thereto from input terminal 12, and the gate of transistor Q2 has input clock pulse $\phi_2$ applied thereto from input terminal 14.

The output circuits of transistors Q1 and Q2 are connected between node 22 and negative and positive potential source 24 and 25 respectively, node 22 being connected by line 16 to the gate of a switch device in the form of a field effect transistor Q3. The output circuit of transistor Q3 is connected between output line 26 and output terminal 11, on the one hand, and point 24 representing a source of negative voltage capable of charging output terminal 11 to a first or operative level, on the other hand. A switch device in the form of field effect transistor Q4, receiving input clock pulse $\phi_1$ at its gate, has its output circuit connected between point 28 on line 26 and voltage source point 24.

A switch in the form of field effect transistor Q5 receives input clock pulse $\phi_2$ at its control terminal, has one of its output terminals connected to voltage source point 25 and its other output terminal connected to line 26 at point 30.

The operation of circuit 10 is as follows: At the onset of $\phi_1$ time, that is, when input clock pulse $\phi_1$ becomes negative, transistors Q1 and Q4 are turned on. When this occurs, point 28, and hence output terminal 11, is immediately and rapidly charged negatively towards −12 volts through the output circuit of transistor Q4. Node 22 is charged negatively through the output circuit of transistor Q1, that negative signal being applied by line 16 to the control terminal of transistor Q3 thus turning the latter on, thereby further charging point 24 and terminal 11 toward a negative (−12 volt) potential through its output circuit. Thus, when clock pulse $\phi_1$ goes negative, output terminal 11 is charged towards a negative level through the output circuits of both transistors Q3 and Q4, thereby to more rapidly charge terminal 11 to its desired negative level. That negative level will be charged to within one threshold voltage of the −12 volt negative source due to the threshold voltage drop across transistors Q3 and Q4. At $\phi_1$ time, input clock pulse $\phi_2$ is at a positive level so that transistors Q2 and Q5 are turned off, thus opening the paths between node 22 and line 26 to the positive potential source 25.

At the end of $\phi_1$ time the signal at the gate of transistor Q1 becomes positive, thereby to turn off transistor Q1. Since clock pulse $\phi_2$ is still positive in the interval between $\phi_1$ time and $\phi_2$ time, transistor Q2 remains cut off so that node 22, which had previously been negatively charged, remains negative—its discharge path through the output circuit of transistor Q2 remains open. The signal at the gate of transistor Q3 thus remains negative so that transistor Q3 remains turned on. Since transistor Q3 remains on, it continues to supply negative drive through its output circuit to line 26, thus maintaining output terminal 11 negatively charged. This action of transistor Q3 during the interval between $\phi_1$ time and $\phi_2$ time may be described as clamping terminal 11 to a negative level derived from negative source 24 after clock pulse $\phi_1$ has gone positive. Thus, terminal 11 remains negatively charged and is affirmatively maintained at that level by the clamping action provided by the operation of transistor Q3. That negative level is stable, independent of external load conditions, and is not effected to any appreciable degree by feedback and noise signals from the external load circuits (not shown) operatively connected to terminal 11.

At the onset of $\phi_2$ time, that is, at the beginning of the negative going edge of $\phi_2$, transistors Q2 and Q5 are turned on. When transistor Q2 becomes conductive, input node 22 is connected through the output circuit of transistor Q2 to the positive potential source 25, thus charging node 22 positively and thereby turning transistor Q3 off. When transistor Q3 is turned off line 26 and output terminal 11 are no longer connected to the negative potential source. When transistor Q5 becomes conductive, line 26 and output terminal 11 are connected through the output circuit of transistor Q5 to point 25 and the +12 volt source, thus charging terminal 11 to +12 volts. At the onset of $\phi_2$ time output terminal 11 thus is charged to a positive potential and the negative drive which had previously been applied through transistor Q3 is terminated. The $\phi'_1$ clock phase output signal developed at output terminal 11 has the wave-shape as shown in the second row of FIG. 1. Clock phase $\phi'_1$ has an initial negative portion 32 at approximately −8 volts beginning at the onset of $\phi_1$ time, and a positive (+12 volts) portion 34 beginning at the onset of $\phi_2$ time and extending in time until the subsequent $\phi_1$ time, at which time $\phi'_1$ is once again driven negative.

It will be seen that circuit 10*a*, illustrated in FIG. 2B, is substantially similar to the arrangement of that of circuit 10, with the significant exception that the input clock pulse signals $\phi_1$ and $\phi_2$ applied to terminals 12*a* and 14*a* are now reversed, so that transistor Q1*a* receives input clock pulse $\phi_2$ at its control terminal at 12*a*, and transistor Q2*a* receives input clock pulse $\phi_1$ at its control terminal at 14*a*. In the operation of circuit 10*a*, transistors Q2*a* and Q5*a* are turned on during $\phi_1$ time to charge node 22*a* and line 26*a* positively. The positive potential at node 22*a* is applied to the control terminal of transistor Q3*a* by line 16*a* and causes transistor Q3*a* to be cut off, so that there is no negative drive at output terminal 11*a* through the output circuit Q3*a* at that time. Transistors Q1*a* and Q4*a* are also cut off so that output terminal 11*a* is positively charged towards +12 volts. Node 22*a* remains positively charged until the onset of $\phi_2$ time at which time transistors Q1*a* and Q4*a* are turned on, thus charging node 22*a* and line 26*a* negatively through their respective output circuits. The charging of node 22*a* towards a negative potential turns transistor Q3*a* on, and negatively charges line 26*a*. Output terminal 11*a* is thus charged negatively to −8 volts at the onset of $\phi_2$ time and will remain negative until the subsequent $\phi_1$ time, that negative charge being maintained at terminal 11*a* as a result of the negative drive continually supplied to terminal 11*a* through the output circuit of transistor Q3*a* until the next $\phi_1$ time. Thus, as shown in the fourth row of FIG. 1 the output signal $\phi'_2$ generated by circuit 10*a* has a positive portion 36 beginning at $\phi_1$ time and extending until the onset of $\phi_2$ time, at which time clock phase $\phi'_2$ becomes negatively charged at −8 volts as at 38, and remains at that level until the onset of the next $\phi_1$ time. The four clock phases, that is, the input clock pulses $\phi_1$ and $\phi_2$ and the output clock phases $\phi'_1$ and $\phi'_2$ generated by circuits 10 and 10*a*, are applied to a plurality of output circuits (not shown) to control the timed operation of these circuits.

In asynchronous operation of the system, the subsequent $\phi_1$ negative pulse after a $\phi_2$ negative pulse may not arrive for several micro-seconds as indicated by the dashed line in the top row of FIG. 1. It is, however, desired to maintain clock phase $\phi'_2$ negatively charged until the occurrence of that subsequent $\phi_1$ time. In a typical arrangement of the circuits 10 and 10*a*, the switching transistors are formed on a single chip of semi-conductor material, the substrate of this material being commonly biased at a reference substrate potential which may conveniently be set at +12 volts. Thus, in the period between the end of $\phi_2$ time and onset of the next $\phi_1$ time during asynchronous operation, the voltage at output terminal 11*a* may tend to leak positive towards the substrate potential. To prevent this from occuring, point 28*a* is connected through a switch in the form of field effect transistor Q6 to the negative potential source 24. The gate and source of the transistor Q6 are connected to one another and to point 24, thereby to constitute a high conductive impedance in excess of 100K ohms. Transistor Q6 serves to maintain terminal 11*a* negative during the intervals between $\phi_2$ and $\phi_1$ but has a sufficiently high impedance as to permit terminal 11*a* to charge positively during $\phi_1$ time in the manner described above.

The provision of the high resistance defined by transistor Q6 which operatively connects terminal 11*a* to the substrate potential requires additional means for ensuring that terminal 11*a* remains positively charged during $\phi'_1$ time. Hence an additional switching device in the form of a field effect transistor Q7 is arranged in parallel with transistor Q5*a* and receives at its control terminal the output clock phase $\phi'_1$ from terminal 11 of circuit 10. Thus, at $\phi'_1$ time, transistor Q7 is turned on, thereby operatively connecting terminal 11*a* to the positive source 25, thereto to insure that the signal at terminal 11*a* will remain positive during $\phi'_1$ time despite the inclusion of the resistance defined by transistor Q6, which tends to urge terminal 10*a* towards a negative potential.

Thus, the present invention has provided clock circuits for generating two overlapping clock phases from two sequential timed input clock pulses, the overlapping signals being developed in a specified time relationship with respect to the input clock pulses and at a 180° phase displacement from one another. Means are provided to affirmatively maintain or clamp the output clock phases at their desired negative potentials during the period between the two input clock pulses so that the wave form of the output signals is stable and unaffected by external load conditions in that period.

Furthermore, since in the preferred embodiment here illustrated, the output terminals are charged negatively through a pair of transistors, one of which is directly controlled by $\phi_1$, the output signal in each circuit approaches its desired negative level at a faster rate than would be available through a single switch transistor of comparable small size. The circuit of the present invention may be readily incorporated on a single chip of semiconductor material which may also include the plurality of logic circuits which receive the generated clock pulses. Moreover, the circuit of the present invention may be readily operated at high-frequencies such as those used in high-speed computer operation.

While only a single embodiment of this invention has been herein specifically disclosed, it will be apparent that variations may be made thereto without departing from the spirit and scope of the invention as defined in the following claims.

We claim:

1. A clock circuit for converting sequential first and second unique time input signals having a time interval therebetween into an output signal having first and second levels, said circuit comprising an output terminal at which said output signal is to be developed, a potential source for charging said output terminal to its first level, first switch means actuated by said first and second input signals and effective when actuated to operatively connect said source to said output terminal during said first input signal and in the interval between said first and second input signals, thereby to charge said output terminal to and maintain said output terminal at said first level until said second input signal appears, and second switch means actuated by said second input signal and effective when actuated to charge said output terminal to the second of its levels.

2. The clock circuit of claim 1, said first switch means comprising means actuated by said first input signal operatively connected to said output terminal and to said source, and effective when actuated to operatively connect said output terminal to said source, and separate means operatively actuated by said first and second signal inputs operatively connected to said output terminal and to said source, and effective when actuated by said first input signal to connect said output terminal to said source and effective when actuated by said second switch means to disconnect said output terminal from said source.

3. The clock circuit of claim 2, comprising a node, said first switch means comprising first and second switch devices operatively connected to said node and effective when respectively actuated by said first and second input signals to charge said node to one level during said first input signal, and to another level during said second input signal, and a third switch device connected between said source and said output terminal having a control terminal operatively connected to said node and actuated to connect said source and said output terminal when said node is at said one level.

4. The clock circuit of claim 3, in which said first switch means comprises a fourth switch device directly actuated by said first input signal, and having an output circuit operatively connected to said source and to said output terminal.

5. The clock circuit of claim 4, comprising a second potential source for charging said output terminal to the second of its levels, said second switch means having an output circuit operatively connected between said second source and said output terminal.

6. The clock circuit of claim 3, comprising a second potential source for charging said output terminal to the second of its levels, said second switch means having an output circuit operatively connected between said second source and said output terminal.

7. The clock circuit of claim 6, comprising high impedance means operatively connected between said output terminal and said first mentioned potential source, thereby to maintain said output terminal at the first of its levels by preventing said output terminal from leaking towards said second of its levels in the period between said second input signal and the following first input signal.

8. The clock circuit of claim 7, comprising third switch means actuated by a disabling signal and effective when actuated to operatively connect said second source to said output terminal, thereby maintaining said output signal at said second level when said third switch means is so actuated.

9. The clock circuit of claim 6, comprising third switch means actuated by a disabling signal and effective when actuated to operatively connect said second source to said output terminal, thereby maintaining said output signal at said second level when said third switch means is so actuated.

10. The clock circuit of claim 2, comprising a second potential source for charging said output terminal to the second of its levels, said second switch means having an output circuit operatively connected between said second source and said output terminal.

11. The clock circuit of claim 10, comprising high impedance means operatively connected between said output terminal and said first mentioned potential source, thereby to maintain said output terminal at the first of its levels by preventing said output terminal from leaking towards said second of its levels in the period between said second input signal and the following first input signal.

12. The clock circuit of claim 11, comprising third switch means actuated by a disabling signal and effective when actuated to operatively connect said second source to said output terminal, thereby maintaining said output signal at said second level when said third switch means is so actuated.

13. The clock circuit of claim 1, comprising a second potential source for charging said output terminal to the second of its levels, said second switch means having an output circuit operatively connected between said second source and said output terminal.

14. The clock circuit of claim 13, comprising high impedance means operatively connected between said output terminal and said first mentioned potential source, thereby to maintain said output terminal at the first of its levels by preventing said output terminal from leaking towards said second of its levels in the period between said second input signal and the following first input signal.

15. The clock circuit of claim 14, comprising third switch means actuated by a disabling signal and effective when actuated to operatively connect said second source to said output terminal, thereby maintaining said output signal at said second level when said third switch means is so actuated.

16. The clock circuit of claim 13, comprising third switch means actuated by a disabling signal and effective when actuated to operatively connect said second source to said output terminal, thereby maintaining said output signal at said second level when said third switch means is so actuated.

17. The clock circuit of claim 1, comprising high impedance means operatively connected between said output terminal and said first mentioned potential source, thereby to maintain said output terminal at the first of its levels by preventing said output terminal from leaking towards said second of its levels in the period between said second input signal and the following first input signal.

18. The clock circuit of claim 17, comprising third switch means actuated by a disabling signal and effective when actuated to operatively connect said second source to said output terminal, thereby maintaining said output signal at said second level when said third switch means is so actuated.

19. The clock circuit of claim 1, comprising third switch means actuated by a disabling signal and effective when actuated to operatively connect said second source to said output terminal, thereby maintaining said output signal at said second level when said third switch means is so actuated.

20. In combination with the circuit of claim 1, a second clock generating circuit comprising a second output terminal, first switch means actuated by said second and first input signals and effective when actuated to operatively connect said source to said second output terminal during said second input signal and in the interval between said second and first input signals, and second switch means actuated by said first input signal and effective when actuated to charge said second output terminal to said second level.

21. The combination of claim 20, said second clock generating circuit comprising high impedance means operatively connected between said second output terminal and said first mentioned potential source, thereby to maintain said second output signal at its first level by preventing said output terminal from leaking to the second of its levels in the period between said second input signal and the following said first input signal.

22. The combination of claim 21, said second clock generating circuit comprising third switch means actuated by said output signal from said first mentioned output terminal, operatively connected between said second potential source and said second output terminal, and effective when actuated to charge said second output signal to said second level when said output signal from said first output terminal is at the first of its levels.

23. The combination of claim 20, said second clock generating circuit comprising third switch means actuated by said output signal from said first mentioned output terminal, operatively connected between said second potential source and said second output terminal, and effective when actuated to charge said second output signal to said second level when said output signal from said first output terminal is at the first of its levels.

References Cited

UNITED STATES PATENTS

| | | | |
|---|---|---|---|
| 3,461,312 | 8/1969 | Farber et al. | 307—251 XR |
| 3,480,796 | 11/1969 | Polkinghorn et al. | 307—304 XR |
| 3,497,715 | 2/1970 | Yao Tung Yen | 307—208 XR |

STANLEY T. KRAWCZEWICZ, Primary Examiner

U.S. Cl. X.R.

307—251, 265, 279, 289